United States Patent [19]
Mansfield

[11] Patent Number: 5,841,648
[45] Date of Patent: Nov. 24, 1998

[54] ADJUSTABLE VOLTAGE CONVERTER UTILIZING A CHARGE PUMP

[75] Inventor: William M. Mansfield, Lafayette, Colo.

[73] Assignee: Micro Motion, Inc.

[21] Appl. No.: 865,052

[22] Filed: May 29, 1997

[51] Int. Cl.⁶ .......................... H02M 3/335; H02M 3/18
[52] U.S. Cl. ..................... 363/59; 363/60; 307/110
[58] Field of Search ........................ 363/59, 60, 97; 307/109, 110

[56] References Cited

U.S. PATENT DOCUMENTS

| | | | |
|---|---|---|---|
| 4,236,199 | 11/1980 | Stewart | 363/60 |
| 4,777,577 | 10/1988 | Bingham et al. | 363/60 |
| 4,802,739 | 2/1989 | Iwamoto | 307/110 |
| 4,888,677 | 12/1989 | Grimm et al. | 363/60 |
| 5,132,895 | 7/1992 | Kase | 363/60 |
| 5,262,934 | 11/1993 | Price | 363/60 |
| 5,306,954 | 4/1994 | Chan et al. | 363/60 |
| 5,410,465 | 4/1995 | Tan | 363/60 |
| 5,486,992 | 1/1996 | Koscica et al. | 363/60 |
| 5,526,253 | 6/1996 | Duley | 363/59 |
| 5,566,059 | 10/1996 | Tan | 363/60 |
| 5,606,491 | 2/1997 | Ellis | 363/60 |
| 5,625,544 | 4/1997 | Kowshik | 363/59 |
| 5,699,312 | 12/1997 | Wong | 365/226 |

*Primary Examiner*—Peter S. Wong
*Assistant Examiner*—Bao Q. Vu
*Attorney, Agent, or Firm*—Duft, Graziano & Forest P.C.

[57] ABSTRACT

An adjustable charge pump design employs a variable voltage level means to reduce the charge on the charge pump charging capacitor. The charge pump output is thereby controlled without the use of any secondary pass elements applied to the charge pump output voltage. The variable voltage level means, e.g. a variable resistor, "steals" voltage from the charging capacitor in either an inverting charge pump configuration or a doubling configuration. The voltage converter employing the adjustable charge pump is advantageously applied to providing an adjustable contrast control for an LCD display. Certain intrinsic safety requirements are achievable with the present design thereby making possible a backlit, intrinsically safe LCD display.

25 Claims, 4 Drawing Sheets

ADJUSTABLE VOLTAGE CONVERTER UTILIZING A CHARGE PUMP

FIELD OF THE INVENTION

This invention relates to an adjustable output charge pump and more particularly to a power supply and contrast adjust circuit for an intrinsically safe backlit liquid crystal display utilizing an adjustable output charge pump.

STATEMENT OF THE PROBLEM

Certain industries have adopted and enforce standards for "intrinsic safety" relating to instrumentation used in certain "hazardous" areas within a process control plant. Hazardous areas are those sections of a process control plant that have the possibility of an explosive environment. In order to be safely utilized in a hazardous area, process control instrumentation must utilize protective measures to prevent the ignition of materials in the explosive environment. This can be achieved by various methods, including encapsulation, pressurization, and the use of flameproof containment. These methods work by preventing the flammable atmosphere from contacting the device where hot surfaces or sparks might cause ignition. Intrinsic safety is another method of protection in which the atmosphere is allowed to come in contact with the equipment only because the equipment has been designed in a way that it is incapable of causing ignition in the atmosphere, even in the presence of faults occurring within or applied to the equipment. Intrinsic safety requirements are met by limiting the amount of energy in a circuit such that sparks and heat cannot be generated at levels sufficient to ignite the atmosphere.

The amount of energy in an intrinsically safe circuit ("IS circuit") is limited both in terms of instantaneous energy and in terms of stored energy. The instantaneous energy is limited by "barrier" circuits that are located in a flameproof enclosure or a safe area. Typically most of the circuitry comprising a piece of process control instrumentation is maintained in a safe area or in a flameproof enclosure located in a hazardous area. Every connection between the circuit within the flameproof enclosure and the IS circuit is through a barrier circuit that limits the maximum current and voltage available to the IS circuit. The components used in barrier circuits are relatively large and relatively expensive thus product cost and package size increases as the number of connections to an IS circuit increases. The stored energy in the IS circuit is limited by minimizing the size of energy storage devices, e.g. capacitors and inductors, in the IS circuit.

It is desirable for instrumentation used in process plants to provide a local visual readout of data (referred to herein as "field-mount display"). Not only are field-mount displays valued by users of process control instrumentation but backlit displays are preferable to aid reading the displays in low light conditions. Intrinsic safety requirements present difficult implementation issues regarding field-mount displays, especially backlit displays. A field-mount display can be encapsulated within a transparent explosion-proof enclosure but this is an extremely expensive solution that is not realistic for most applications. The intrinsic safety requirements limit the amount of power that can be supplied to the field-mount display. Also, a backlit Liquid Crystal Display ("LCD display") requires three power supplies. One supply to power the digital circuitry, a second supply for the display contrast and a third supply for backlighting. Existing LCD displays in the process control industry are therefore relatively small (one or two line displays) and are not backlit.

There exists a need for an intrinsically safe, backlit Liquid Crystal Display ("LCD display") using a minimum number of connections between the IS circuit including the LCD display and the safe circuit within the safe area or flameproof enclosure.

STATEMENT OF THE SOLUTION

The above described problems and others are solved and an advance in the art is achieved by the power supply and contrast adjust system of the present invention. The system of the present invention provides an intrinsically safe, backlit LCD display that receives all of its power over only two connections from a flameproof enclosure. Two additional connections provide a signal to the display. All three power supplies for the IS circuit are achieved through careful utilization of the single supplied IS voltage and the use of a charge pump with a unique architecture.

A single intrinsically safe voltage (IS_PWR) is supplied over two connections (between IS_PWR+ and IS_PWR−) from a safe area or flameproof enclosure to the IS circuit. The display requires three supply voltages for proper operation. $V_{CC}$ (+5 V) is the supply used to power the digital circuitry of the LCD display. $V_{EE}$ is a variable negative supply used for contrast control of the LCD display. $V_{bl}$ is the supply for the backlight. Low voltage backlighting is provided by a floating array of light-emitting diodes thus the common mode voltage of $V_{bl}$ is irrelevant. In the system of the present invention, all three of these supply voltages are derived from IS_PWR. $V_{CC}$ is derived using a negative regulator to, in effect, use the "top" 5 volts of IS_PWR as the 5V $V_{CC}$ supply. This provides the $V_{CC}$ voltage to the display but also has the advantage that the overhead voltage of the regulator is not wasted. In fact, the overhead voltage of the negative regulator is summed to the output of a charge pump to provide the $V_{EE}$ supply. The backlight is satisfied by the raw IS_PWR supply voltage as the backlight circuit consists of a floating array of diodes and the common mode voltage is irrelevant.

A charge pump is used to convert IS_PWR to a variable, negative $V_{EE}$ to control the LCD contrast. Existing contrast control circuits use a fixed negative supply voltage with an adjustable secondary pass element, e.g. an op-amp and a transistor, to vary the amplitude of the voltage supplied to the display to accomplish contrast adjustment. However, the pass element requires voltage overhead that in combination with the required display capacitance violates intrinsic safety requirements with respect to energy storage elements.

In the system of the present invention, the voltage stored on the charging capacitor of the charge pump is controlled such that the output of the charge pump is at the desired voltage level without the need for any further control elements. A single stage of charge pump includes two capacitors. The charging capacitor is charged to the input voltage and then is discharged into the filter capacitor. The charge pump generates an output voltage that is dependent upon the voltage stored across the charging capacitor. In the present invention, a transistor is placed in series with the charging capacitor. The impedance of the transistor is controlled to "steal" voltage away from the charging capacitor. Thus the output of the charge pump is directly controlled by controlling the impedance of the transistor with a control loop to produce the desired charge pump output. The output of the charge pump is summed with the overhead voltage of the negative regulator to produce a $V_{EE}$ that is variable from about −4 V to about −12 V.

The charge pump of the present invention is operated at a relatively high frequency in order to minimize the size of capacitors in the charge pump. This further enhances the intrinsic safety characteristics of the system of the present invention.

The present invention utilizes a single supply (IS_PWR) of about 9 Volts to derive $V_{CC}$(+5 V), $V_{EE}$(-4 V to -12 V) and $V_{bl}$(+9 V). The control and storage elements of existing systems are eliminated through careful use of a controlled charge pump and a negative regulator.

DETAILED DESCRIPTION

Figure 1:
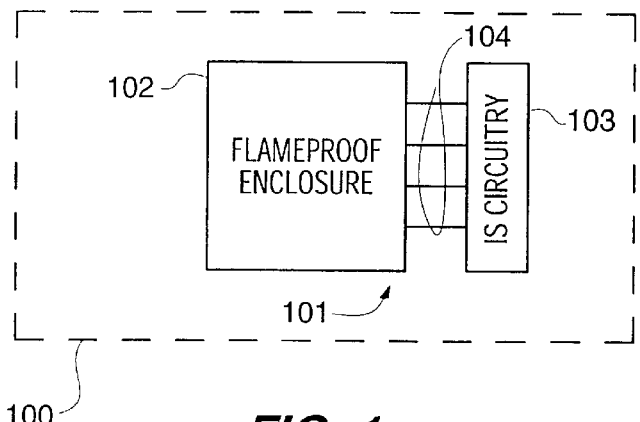
FIG. 1 is a schematic view of an instrument within a hazardous area.
Figure 2:
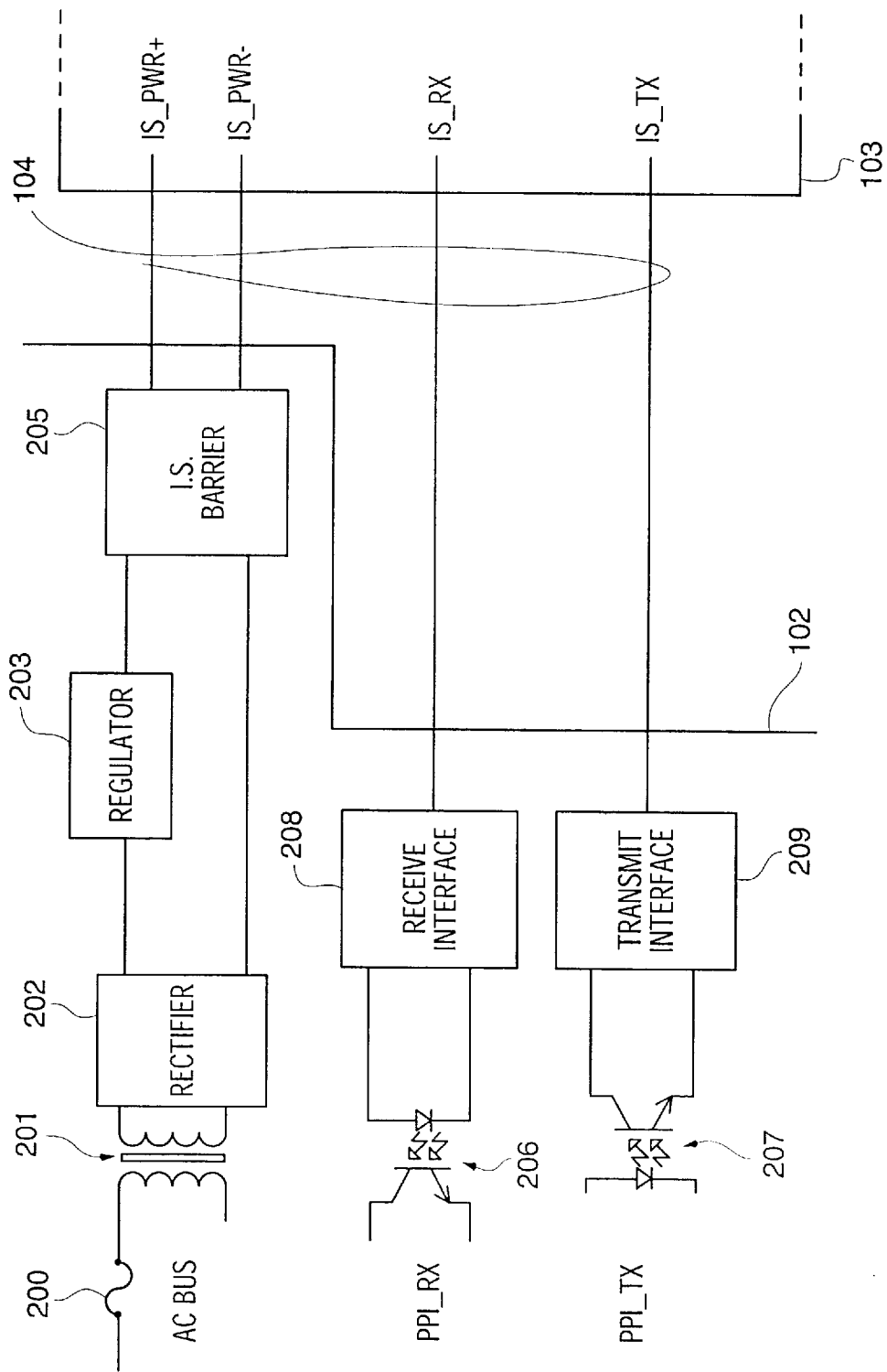
FIG. 2 is a block diagram of the interface between a circuit in a safe area and an intrinsically safe circuit.

Intrinsic Safety In General—FIGS. 1–2

The concept of and requirements for intrinsic safety are described with respect to FIGS. 1–2. The general concept of intrinsic safety does not form part of the present invention however its requirements form part of the motivation for the present invention. FIG. 1 is a schematic diagram of a piece of process control instrumentation 101 within a hazardous environment 100. Instrumentation 101 is comprised of flameproof enclosure 102 which is connected to intrinsically safe circuit ("IS circuit") 103 through connections 104. An intrinsically safe circuit is a circuit in which any spark or any thermal effect produced by the circuit is not capable of causing ignition of a given explosive atmosphere such as hazardous environment 100. Various standards organizations around the World have defined what a hazardous environment is and set standards for the design of instrumentation to be used in such areas. European Standard EN 50020 ("Electrical apparatus for potentially explosive atmospheres—Intrinsic safety 'i'") is an example of such a standard. Standards such as European Standard EN 50020 define the instantaneous power (in terms of current and voltage levels) of all signals over connections 104 to IS circuit 103. These standards also define the allowable amount of stored energy in IS circuit 103. For a circuit designed to meet a standard such as European Standard EN 50020, misapplications of IS circuit 103, or countable and non-countable faults as prescribed in such standards, that might occur in IS circuit 103 or circuits contained within flameproof enclosure 102, must not result in enough energy available at IS circuit 103 to cause the ignition of a certain explosive atmosphere such as exists in hazardous environment 100.

FIG. 2 depicts the interface between IS circuit 103 and flameproof enclosure 102 in more detail. Elements 200–205 comprise a power supply which is external to IS circuit 103 and which provides an intrinsically safe source of power over lines IS_PWR+ and IS_PWR- to IS circuit 103. Transformer 201 provides the fundamental galvanic isolation for IS_PWR supplied to IS circuit 103. Fuse 200 protects transformer 201 from heat rise and provides an upper limit to the current on the secondary of transformer 201. Rectifier 202 rectifies the AC voltage on the secondary of transformer 201. Regulator 203 takes the rectified AC voltage from rectifier 202 as input and outputs a regulated DC voltage. In a preferred embodiment of the present invention the output of voltage regulator 203 is 11 V. Intrinsic Safety ("I.S.") barrier 205 includes zener diodes arranged to limit the output voltage of I.S. Barrier 205 over IS_PWR+ and IS_PWR-.

In a preferred embodiment of the present invention, the charge pump circuit of the present invention is used to provide power for an LCD display. IS_PWR is manipulated, as described below, to provide the necessary and various power supplies. Signals are sent to the LCD display and received from the LCD display via lines IS_TX and IS_RX, respectively. These lines are isolated from the remaining circuitry (not shown) within flameproof enclosure 102 by opto-couplers 206 and 207 and interfaces 208 and 209. The selection and operation of elements 200–209 are not pertinent to the present invention. They are described here only for purposes of providing the context for the origination of IS_PWR whose use is described in the remainder of the specification.

Figure 3:
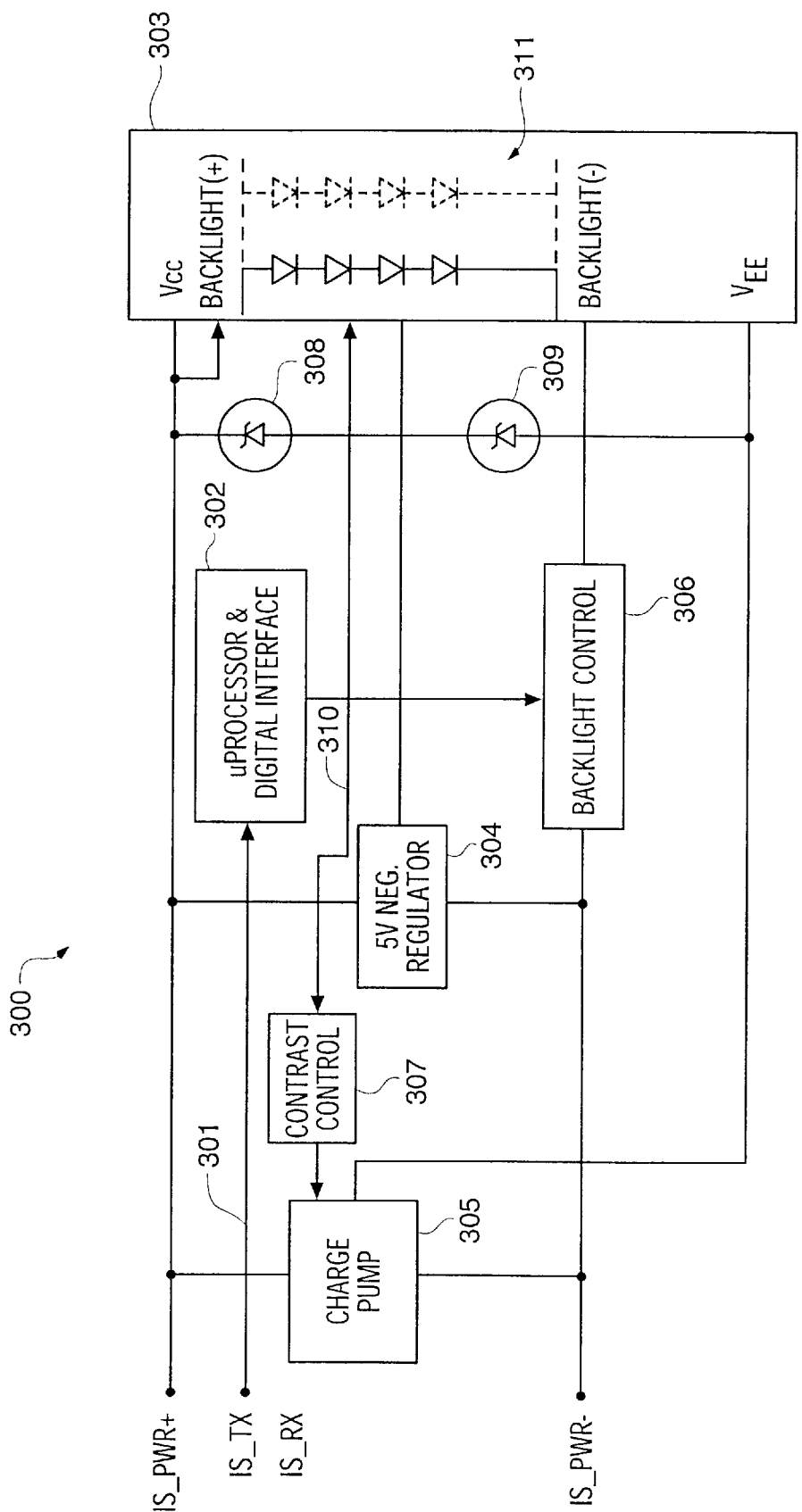
FIG. 3 is a block diagram of a power supply and contrast control for an intrinsically safe LCD display according to the present invention.

Power Supply and Contrast Control Circuit In General—FIG. 3

FIG. 3 depicts a block diagram of a power supply and contrast control circuit 300 within IS circuit 103. A single fixed, intrinsically safe power source, IS_PWR, is provided over lines IS_PWR+ and IS_PWR-. As noted with respect to FIG. 2, IS_PWR is generated externally to IS circuit 103. IS_TX and IS_RX, the transmit and receive signals communicated from and to, respectively, the circuit contained within flameproof enclosure 102 are received over lines 301 by microprocessor 302. Microprocessor 302 processes these signals to produce human-readable output on LCD 303. The operation of microprocessor 302 to produce output on LCD 303 is well-known to those skilled in the art and does not form part of the present invention.

LCD 303 requires three different power supplies for proper operation. All three supplies, $V_{CC}$, $V_{EE}$ and $V_{bl}$, are generated, as described below, from IS_PWR. In a preferred embodiment of the present invention IS_PWR is designed for nominal operation at 150 milliamps (mA) at 9 volts to optimally satisfy both the intrinsic safety requirements of European Standard EN 50020 as well as the operational requirements of circuit 300 and LCD 303. European Standard EN 50020 specifies the maximum allowable short circuit current for each value of open circuit voltage, e.g. IS_PWR, $V_{CC}$, $V_{EE}$ and $V_{bl}$, implicitly limiting the instantaneous amount of energy available in the hazardous area. Given the nominal current and nominal output voltage of IS_PWR in the preferred embodiment of the present invention, the values of various protection devices, including fuses, current limiting resistors, and voltage limiting diodes, e.g. elements 200–205 of FIG. 2, are determined in such a way as to deliver the maximum amount of power at the desired operational output voltage and output current while simultaneously remaining below the energy limits dictated by European Standard EN 50020.

It is desirable and advantageous to minimize the voltage supplied to circuit 300 in order to allow the use of the largest possible capacitive storage elements in circuit 300, as the energy stored in these elements is proportional to the square of the voltage across them. For a given output voltage that satisfies the operation requirements of circuit 300 and LCD 303, it is advantageous to choose a limiting point to the short circuit current that approaches as nearly as is practicable the limits imposed by European Standard EN 50020, so that the output impedance of the circuit supplying power, e.g. Elements 200–205 of FIG. 2, may be minimized, and in turn the dependency of output voltage on output current may be minimized.

$V_{CC}$ is the supply for the digital circuitry of circuit 300. In the preferred embodiment of the present invention, $V_{CC}$ is about 5 V and must supply about 30 mA maximum current. $V_{EE}$ is the voltage applied to LCD 303 to control the contrast of LCD 303. In the preferred embodiment of the present invention, $V_{EE}$ is variable from −4 V to about −12 V and must supply about 20 mA maximum current. $V_{bl}$ is the voltage applied to LCD 303 to power backlight array 311 of LCD 303. Typically backlighting for an LCD display is accomplished with an array 311 of diodes which emit light when an appropriate voltage is applied across the array 311. In the preferred embodiment of the present invention $V_{bl}$ is about 8.5 V and must supply about 100 mA maximum current. Thus, in the preferred embodiment of the present invention, IS_PWR must supply about 150 mA at about 9 V.

Negative voltage regulator 304 is coupled between IS_PWR+ and IS_PWR−. Voltage regulator 304 effectively derives ground 5 V below IS_PWR+ to provide a $V_{CC}$ of 5 V at the $V_{CC}$ input to LCD 303. There are other topologies by which one can derive a ground but using negative voltage regulator 304 has the advantage of not wasting the voltage overhead of the regulator. The stringent intrinsic safety requirements require that IS_PWR be carefully manipulated with a minimum of wasted power. As discussed more fully below, the voltage overhead of regulator 304 is effectively summed with the output of charge pump 305 to produce $V_{EE}$.

IS_PWR is applied directly to the $V_{bl+}$ and $V_{bl-}$ inputs of LCD 303 in order to power the backlight LED array. Backlight control 306 is a switched current sink allowing a user to turn backlighting for LCD 303 on and off.

Contrast control 307 is adjustable by a user to control the contrast level on LCD 303. Contrast control 307 receives input digitally over path 310 from microprocessor 302 and controls the amplitude of $V_{EE}$, as described more fully below.

Zener diodes 308–309 function as shunt voltage limiters to the capacitive energy storage elements in circuit 300. Zener diodes 308–309 effectively limit the capacitive energy storage capability of circuit 300. Additional zener diodes (not shown) in I.S. Barrier 205, with reference to FIG. 2, provide the same protection for $V_{bl}$. Use of zener diodes to establish "clamp" voltages is well-known by those skilled in the art of intrinsically safe designs.

Figure 4:
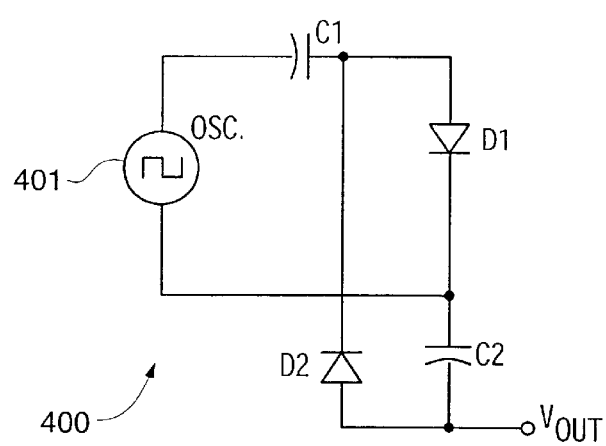
FIG. 4 is a simplified schematic of an existing charge pump.
Figure 5:
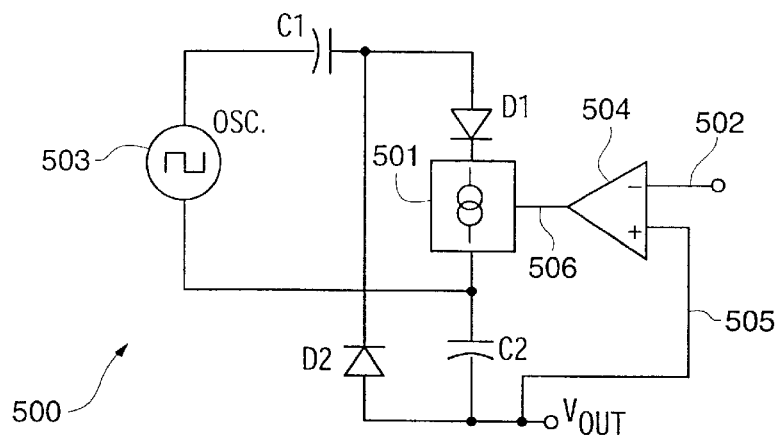
FIG. 5 is a simplified schematic of a charge pump and contrast control according to the present invention.
Figure 6:
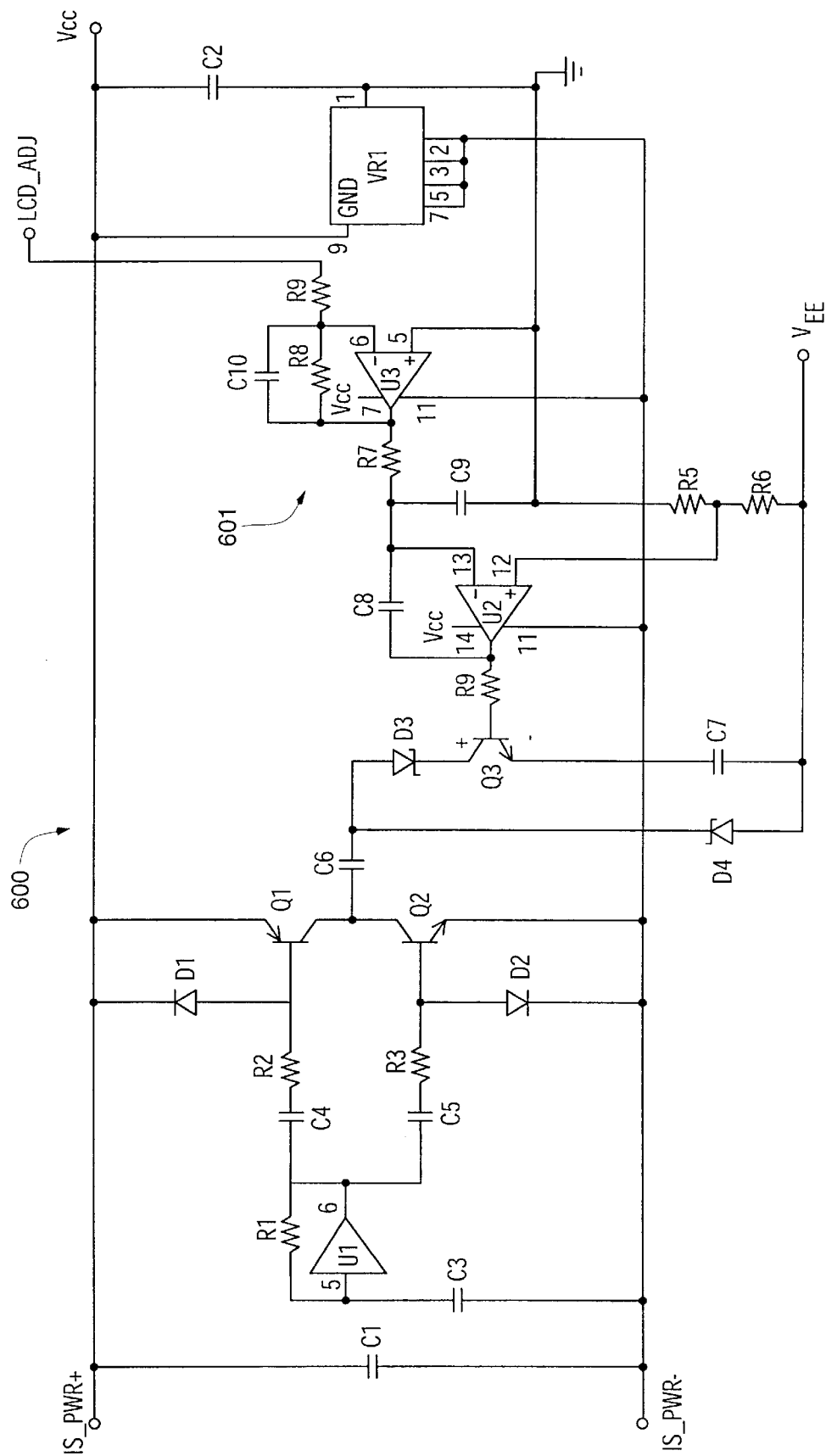
FIG. 6 is a schematic of a power supply and contrast control according to the present invention.

Charge Pump and Contrast Control—FIGS. 4–6

FIG. 4 depicts a simplified schematic of a well-known charge pump circuit 400. In this example, diodes are used to direct current flow, although analog switches can also be used. Furthermore, the given implementation is an inverting converter, but a voltage doubling configuration provides equivalent applicability of the current invention. Oscillator 401 produces a square wave signal which, during its on half-cycle, charges charging capacitor $C_1$ to a voltage level substantially equal to the amplitude of the output of oscillator 401. During the on half-cycle of oscillator 401, current flows from oscillator 401 through charging capacitor $C_1$ (thereby charging capacitor $C_1$) and diode $D_1$ back to the negative side of oscillator 401. During the off half-cycle of output from oscillator 401, the charge accumulated on charging capacitor $C_1$ is delivered to filter capacitor $C_2$. During the off half-cycle of oscillator 401, current flows from charging capacitor $C_1$ through oscillator 401, through filter capacitor $C_2$ (thereby charging filter capacitor $C_2$) and through diode $D_2$ back to charging capacitor $C_1$. If $C_1$ and $C_2$ are of equal capacitance then on each cycle half the charge difference between $C_1$ and $C_2$ is transferred to $C_2$. Circuit 400 is an inverting charge pump thus $V_{out}$ asymptotically approaches $-V_{osc}$ where $V_{osc}$ is the voltage of oscillator 401, assuming the rate of charge loss due to loading is less than the rate at which oscillator 401 supplies charge.

Charge pump circuit 400 provides a mechanism whereby a certain voltage is converted to another voltage level by the transfer of charge from charging capacitor $C_1$ to filter capacitor $C_2$. The amount of charge in coulombs across a capacitor is equal to the product of the capacitance in Farads and the voltage in Volts. Since more charge is present at a given voltage on a large capacitor than a small one, it is generally beneficial to maximize size of the capacitors of a charge pump in order to be able to deliver maximum charge. Current delivery (charge per unit time) is a function of the frequency of oscillator 401. Since minimization of capacitance is required to meet intrinsic safety requirements, the operating frequency of charge pump circuit 400 is maximized to provide maximum current drive. Existing contrast control circuits utilize a fixed $V_{out}$ with an adjustable secondary pass element (not shown), e.g. a transistor and op-amp, to produce an adjustable $V_{EE}$ for contrast adjustment. However, the pass element requires voltage overhead that in combination with the required display capacitance violates intrinsic safety requirements with respect to energy storage elements.

FIG. 5 depicts a simplified schematic for a charge pump circuit 500 according to the present invention. As noted with respect to FIG. 3, the output of charge pump 305 ($V_{out}$ in FIG. 5) is summed to the overhead voltage of negative regulator 304 to directly produce $V_{EE}$ without any secondary pass element and associated intrinsic safety problems. $V_{out}$ is adjusted by controlling the amount of charge deposited on, and hence the voltage across, charging capacitor $C_1$. This may be accomplished by various means, including but not limited to the controllable limitation of current flow through charging capacitor $C_1$ during the fixed charging interval determined by oscillator 401. Controlling the amount of charge deposited on charging capacitor $C_1$ may also be accomplished by the introduction of a variable element that consumes a portion of the voltage supplied by oscillator 401, leaving a controllable deficit of voltage on charging capacitor $C_1$. Such an element could consist, for example, of a variable resistor, variable capacitor, or dependent voltage source. In a preferred embodiment of the present invention, dependent current sink 501 serves to limit the charge deposited on charging capacitor $C_1$. When dependent current sink 501 is adjusted through input at control 502 to produce an effective short circuit, circuit 500 operates in the same fashion as circuit 400 of FIG. 4. However, impedance introduced by dependent current sink 501 effectively "steals" voltage from charging capacitor $C_1$ causing charging capacitor $C_1$ to charge to a voltage less than that of oscillator 503. As noted with respect to FIG. 4, the voltage on filter capacitor $C_2$ ($V_{out}$) depends on the voltage on charging capacitor $C_1$. Thus, there is less charge to transfer from charging capacitor $C_1$ to filter capacitor $C_2$ and consequently $V_{out}$ is reduced. A control loop including op-amp 504 and feedback 505 provides control over control line 506 of dependent current sink 501 for controlling the level of Vout. Control input 502 is the analog contrast control level set by a digital-to-analog converter controlled by microprocessor 302 in response to user and environmental input.

With reference to FIGS. 3 and 5, if IS_PWR is +9 V then the overhead voltage of 5 V negative regulator 304 is about −4 V. Therefore $V_{EE}$ is equal to −4 V summed with $V_{out}$ (a negative voltage). $V_{out}$ has a maximum value of about −8 V therefore $V_{EE}$ is adjustable from about −4 V to about −12 V. $V_{EE}$ is adjusted by directly controlling the output of charge pump circuit 500 through control input 502.

FIG. 6 is a detailed schematic of a power supply and contrast control circuit 600 for an LCD display utilizing the present invention. Capacitors $C_1$ and $C_2$ provide filtering of IS_PWR and $V_{CC}$, respectively. Elements U1, C3–C5, R1–R3, D1–D2 and Q1–Q2 form the oscillator for the charge pump of circuit 600. Schmitt trigger inverter U1, resistor R1 and capacitor C3 operate as a Schmitt trigger oscillator to generate a 5 V square wave at about 600 kHz at the output of Schmitt trigger inverter U1. The 5 V square wave at the output of Schmitt trigger inverter U1 is AC coupled to the base-emitter diode of transistor Q1 and IS_PWR+ via diode D1 and capacitor C4. The 5 V square wave at the output of Schmitt trigger inverter U1 is AC coupled to the base-emitter diode of transistor Q2 and IS_PWR− via diode D2 and capacitor C5. Thus the single square output from Schmitt trigger inverter U1 drives both transistor Q1 and transistor Q2. The time constant formed by capacitor C4 and resistor R2 and by capacitor C5 and resistor R3 should be much longer than the oscillator period (approximately 1.6 µS) so that a clean square wave is presented to the bases of transistors Q1 and Q2. Resistors R2 and R3 also serve to limit the base current in transistors Q1 and Q2, respectively, to approximately 1 mA.

Transistors Q1 and Q2 form a push-pull driver. Since the same waveform drives the base of each, and transistor Q2 is NPN and transistor Q1 is PNP, they will turn on during alternate half-cycles of the base voltage. For purposes of describing the operation of the charge pump, assume that transistor Q3 is fully on. When transistor Q1 is on, capacitor C6 is charged up to IS_PWR (approximately 9 V) less the collector-emitter saturation voltage of transistor Q1 and the forward voltage of diode D3. The sum of the two losses is approximately 0.7 V. When transistor Q1 turns off and transistor Q2 turns on, transistor Q2's collector is forced to ground and since no current can flow in the reverse direction through diode D3, the voltage across capacitor C6 is maintained and the cathode of diode D4 is forced to −9 V. Current can then flow in the forward direction through diode D4, thus charge is transferred between capacitor C6 and capacitor C7.

The output of the charge pump, $V_{EE}$, is dependent upon the voltage stored across capacitor C6 on the charging stroke of the oscillator. Thus the output voltage $V_{EE}$ can be reduced by dropping the voltage at the collector of transistor Q1 across an element in addition to capacitor C6. In the case of circuit 600, transistor Q3 is the additional element across which voltage is dropped to control the voltage across capacitor C6. The base voltage of transistor Q3 is determined by the output of op-amp U2 through resistor R4. $V_{EE}$ is divided down through resistors R5 and R6 as the feedback path to op-amp U2. A digital signal from a microprocessor (not shown) over path LDC_ADJ feeds a amplifier/filter stage 601 comprised of op-amp U3 resistors R7–R9 and capacitors C9–C10. The output of amplifier/filter stage 601 feeds the negative input of op-amp U2 while the divided down VEE voltage feeds the positive input of op-amp U2. The LCD contrast is thereby controlled to a desired level by controlling the voltage drop across transistor Q3.

Negative voltage regulator VR1 provides an output of +5 V at $V_{CC}$. As noted with respect to 3, the overhead voltage (approximately −4 V) of voltage regulator VR1 is added to the output of the charge pump circuit to produce $V_{EE}$.

Table 1 provides exemplary values for the preferred embodiment of circuit 600.

TABLE 1

| Reference Designation | Value (KΩ) | Reference Designation | Value (µF) | Reference Designation | Value |
|---|---|---|---|---|---|
| R1 | 10 | C1 | 0.1 | U1 | HC14 |
| R2 | 2.2 | C2 | 0.1 | U2, U3 | MC33174 |
| R3 | 2.2 | C3 | .000150 | Q1 | 2N3906 |
| R4 | 27 | C4 | .01 | Q2, Q3 | 2N3904 |
| R5 | 12.7 | C5 | .01 | D1, D2 | BAV99 |
| R6 | 53.6 | C6 | .01 | D3, D4 | 1N5817 |
| R7 | 68.1 | C7 | .01 | VR1 | 79L05 |
| R8 | 68.1 | C8 | .01 | | |
| R9 | 140 | C9 | .01 | | |
| | | C10 | .01 | | |

Summary

An adjustable inverting voltage converter is described whereby the output of an inverting charge pump is controlled through a variable element that consumes a portion of the voltage supplied by the charge pump oscillator thereby leaving a controllable deficit of voltage on the charging capacitor. The inverting voltage converter is advantageously applied to contrast control of an LCD display.

I claim:

1. An adjustable voltage converter comprising:
   an oscillator operative to generate an oscillating signal;
   a charge pump operative to generate a variable output voltage from a substantially fixed external power supply voltage responsive to said oscillating signal and to a control signal, said charge pump including:
   a charging element operative to periodically develop a charging voltage from said external power supply voltage according to said oscillating signal;
   a filter element operative to receive charge from said charging element and to develop said output voltage therefrom; and
   output control means, operatively associated with said charging element and responsive to said control signal, for controlling said periodic charging voltage according to said control signal to thereby control said output voltage.

2. The voltage converter of claim 1 wherein said charge pump includes:
   first switching means for applying said external power supply voltage to said charging element during a first half-cycle of said oscillating signal whereby said charging element is charged to said charging voltage; and
   second switching means for coupling said charging element to said filter element during a second half-cycle of said oscillating signal to charge said filter element and thereby produce said output voltage across said filter element.

3. The voltage converter of claim 2 wherein said first and second switching means comprise respective first and second transistors.

4. The voltage converter of claim 2 wherein said first and second switching means comprise respective first and second analog switches.

5. The voltage converter of claim 2:
wherein said first switching means comprises a PNP transistor having an emitter configured to be coupled to a first line of an external power supply, a base coupled to a first output of said oscillator and a collector coupled to a terminal of said charging element; and
wherein said second switching means comprises a NPN transistor having an emitter configured to be coupled to a second line of the external power supply, a base coupled to a second output of said oscillator and a collector coupled to said terminal of said charging element.

6. The voltage converter of claim 1 wherein said output control means includes:
means for comparing said output voltage to a setpoint voltage to generate an output control signal; and
means, responsive to said means for comparing, for controlling said charging voltage according to said output control signal.

7. The voltage converter of claim 6 wherein said means for controlling said charging voltage comprises a dependent current sink coupled in series with said charging element.

8. The voltage converter of claim 7 wherein said dependent current sink includes:
a control transistor coupled in series with said charging element and responsive to said output control signal to vary a voltage across said control transistor such that an increase in said voltage across said control transistor reduces said charging voltage.

9. The voltage converter of claim 6 wherein said means for controlling said charging voltage comprises at least one of a variable resistor, a variable capacitor and a dependent voltage source, coupled in series with said charging element.

10. The voltage converter of claim 6 further comprising a zener diode operative to prevent flow of charge to said charging element when said second switching means is closed, said zener diode having an anode coupled to said charging element and a cathode connected to said means for controlling said charging voltage.

11. The voltage converter of claim 1 further comprising:
ground derivation means for deriving a ground with respect to said external power supply voltage.

12. The voltage converter of claim 11 wherein said ground derivation means includes:
a voltage regulator configured to receive said external power supply voltage and operative to generate a regulated DC voltage having a ground at a fixed voltage with respect to said external power supply voltage.

13. The voltage converter of claim 6 further comprising:
ground derivation means for deriving a ground at a controlled level with respect to said external power supply,
said ground derivation means producing an overhead voltage that is summed to said output voltage to produce a negative voltage adjustable between said overhead voltage and said sum of said overhead voltage and said output voltage.

14. A display unit, comprising:
a liquid crystal display (LCD) having a first input configured to receive an external power supply voltage from an external power supply and a second input configured to receive a variable power supply voltage, wherein said LCD is operative to adjust contrast of the LCD responsive to a variable power supply voltage applied at said second input;
means for generating a contrast control signal; and
a variable power supply circuit, responsive to said means for generating a contrast control circuit, said variable power supply circuit including:
an oscillator operative to generate an oscillating signal;
means, responsive to said oscillator, for periodically developing a charging voltage on a charging element from said external power supply voltage according to said oscillating signal;
means, responsive to said oscillator, for transferring charge from said charging element to a filter element coupled to said second input of said LCD according to said oscillating signal to develop said variable power supply voltage at said second input of said LCD,
said means for periodically developing a charging voltage controlling said charging voltage responsive to said contrast control signal to thereby control said variable power supply voltage.

15. The display unit of claim 14, wherein said charging element and said filter element comprise respective first and second capacitors.

16. The display unit of claim 14, wherein said means for generating a contrast control signal comprises means for processing an external control signal to produce a contrast control signal.

17. The display unit of claim 14, wherein said means for processing an external control signal comprises a microprocessor.

18. The display unit of claim 14:
wherein said means for periodically developing a charging voltage comprises first switching means for applying said external power supply voltage to said charging element to during a first half-cycle of said oscillating signal to charge said charging element to said charging voltage; and
wherein said means for transferring charge comprises second switching means for coupling said charging element to said filter element during a second half-cycle of said oscillating signal to charge said filter element and thereby produce said variable power supply voltage.

19. The display unit of claim 18:
wherein said first switching means comprises a PNP transistor having an emitter configured to be coupled to a first line of an external power supply, a base coupled to a first output of said oscillator and a collector coupled to a terminal of said charging element; and
wherein said second switching means comprises a NPN transistor having an emitter configured to be coupled to a second line of the external power supply, a base coupled to a second output of said oscillator and a collector coupled to said terminal of said charging element.

20. The display unit of claim 14, wherein said means for periodically developing a charging voltage comprises:
means for comparing said variable power supply voltage to a setpoint voltage to generate an output control signal; and
means, responsive to said means for comparing, for controlling said charging voltage according to said output control signal.

21. The display unit of claim 20 wherein said means for controlling said charging voltage comprises a dependent current sink in series with said charging element.

22. The display unit of claim 21, wherein said dependent current sink includes a control transistor configured to be coupled in series with said charging element and responsive to said output control signal to vary a voltage across said control transistor such that an increase in said voltage across said control transistor results in reduction of said charging voltage.

23. The display unit of claim 20 wherein said means for controlling said charging voltage comprises at least one of a variable resistor, a variable capacitor and a dependent voltage source, coupled in series with said charging element.

24. The display unit of claim 14 further comprising ground derivation means for deriving a ground with respect to said external power supply voltage.

25. The display unit of claim 24 wherein said ground derivation means includes a voltage regulator configured to receive said external power supply voltage and operative to generate a regulated DC voltage having a ground at a fixed voltage with respect to said external power supply voltage.

* * * * *